United States Patent [19]

Auger et al.

[11] Patent Number: 4,703,482
[45] Date of Patent: Oct. 27, 1987

[54] UNIVERSAL APPARATUS FOR DETECTING FAULTS IN MICROPROCESSOR SYSTEMS

[75] Inventors: Jean Auger, Chomedey; Donald Laflamme, Repentigny, both of Canada

[73] Assignee: Hydro-Quebec, Montreal, Canada

[21] Appl. No.: 868,444

[22] Filed: May 30, 1986

[30] Foreign Application Priority Data

Feb. 19, 1986 [CA] Canada ................................. 502236

[51] Int. Cl.[4] ........................ G01R 31/28; G06F 11/00
[52] U.S. Cl. ..................................... 371/16; 364/200; 371/20
[58] Field of Search ................. 371/16, 20; 324/73 R, 324/73 AT; 364/200, 900

[56] References Cited

U.S. PATENT DOCUMENTS

| | | | |
|---|---|---|---|
| 4,291,404 | 9/1981 | Steiner | 371/20 |
| 4,455,654 | 6/1984 | Bhaskar et al. | 371/20 |
| 4,500,993 | 2/1985 | Jacobson | 371/16 |
| 4,517,512 | 5/1985 | Petrich et al. | 324/73 R |
| 4,583,223 | 4/1986 | Inoue et al. | 371/20 |
| 4,622,669 | 11/1986 | Pri-Tal | 371/20 X |
| 4,656,632 | 4/1987 | Jackson | 371/20 |

Primary Examiner—Charles E. Atkinson
Attorney, Agent, or Firm—Schwartz, Jeffery, Schwaab, Mack, Blumenthal & Evans

[57] ABSTRACT

A universal apparatus for the detection of faults in microprocessor systems. Microprocessors are commonly commercialized under the form of integrated circuits having a plurality of pins. The apparatus thus comprises a connector provided with pins so positioned that they can be inserted in the connection device of the microprocessor of a faulty system, in the place of the pins of this microprocessor after the same has been withdrawn. An interface defines for each pin of the connector a line having a programmable direction. A programmed controller associated with a memory which stores a copy of the software of the faulty system is connected to the interface for (a) programming the direction of the lines in order to simulate the interconnections which are normally established between the system and its microprocessor, and (b) carrying out tests on this system through the simulated interconnections for detecting the fault. The controller can of course be programmed to detect faults in a plurality of different microprocessor systems. The memory associated therewith then stores a copy of the software of all these systems.

20 Claims, 5 Drawing Figures

UNIVERSAL APPARATUS FOR DETECTING FAULTS IN MICROPROCESSOR SYSTEMS

BACKGROUND OF THE INVENTION

1. Field of the Invention

The present invention relates to a universal apparatus for the detection of faults in microprocessor systems, by simulation of the central processing unit of such systems.

2. Brief Description of the Prior Art

Each day, an increasing number of microprocessor systems are introduced on the market. The technicians responsible for the maintenance and/or repair of such systems must obviously follow a procedure adapted to the microprocessors when intervening on the same.

A certain number of apparatuses especially designed to facilitate repairing of microprocessor systems are available on the market. The most popular of these apparatuses is the one commercialized under the name of "FLUKE DEBUGGER". A drawback of the latter apparatus is that the user must program himself and individually each test carried out on the faulty system. The user must therefore become very familiar with the operation of this apparatus before using it. In some cases, the provision of a course to that effect may be justified.

The facility with which this type of apparatus ("FLUKE DEBUGGER") is used is closely related to its frequency of use. An occasional user therefore needs a familiarization period before each use. This causes both losses of time and a certain incertitude. Moreover, it is well known that, in most of the cases, an apparatus complex in use is in practice rarely employed.

Another drawback of the "FLUKE DEBUGGER" is that a different interface is required for each type of microprocessor. For example, if a company uses systems including four different types of microprocessors, four interfaces are necessary. Additional amounts relative to the purchase of interfaces for each type of microprocessor must therefore be added to the relatively high base price of the "FLUKE DEBUGGER".

SUMMARY OF THE INVENTION

An object of the present invention is to provide an apparatus for detecting a fault in a microprocessor system which is simple in use, which requires only a minimum of familiarization from the user, which has a reduced volume, and which can be produced at a cost well below than that of the apparatuses of this type presently on the market. The simplicity in use and the reduced volume of the apparatus according to the invention facilitate its use on the working sites by anyone having a minimum knowledge about microprocessors.

Another object of the present invention is to provide an apparatus for detecting a fault in a microprocessor system which can be used for different types of microprocessors, and that without necessitating the provision of a different interface for each type of microprocessor.

More specifically, in accordance with the present invention, there is provided an apparatus for detecting a fault in a system including a microprocessor, which microprocessor comprising a plurality of pins individually connected to the system through a connection device. The detecting apparatus comprises a connector provided with pins so positioned that they can be individually connected to the system through the connection device, in the place of the pins of the microprocessor after the latter has been withdrawn from the system, and an interface defining for each pin of the connector a line connected to this pin and having a programmable direction. Control means connected to the interface (a) programs the direction of the lines defined by the interface in order to simulate by means of these lines interconnections which are normally established between the system and its microprocessor, and (b) carries out tests on the microprocessor system through the interconnections simulated by the interface for detecting the fault in the system.

The control means preferably comprises a memory for storing a copy of the software of the microprocessor system.

The control means may further comprise a programmed controller for reading, through the interface and the connector, the software stored within the microprocessor system, and for comparing the so read software with the software copy in order to detect any error appearing in the software stored within the system. Such reading of the software stored within the microprocessor system and comparison of the read software with the software copy constitute one of the tests carried out on the system.

The controller may also be programmed to carry out, through the interface and the connector, tests on a plurality of systems provided with microprocessors of different types, and to program the direction of the lines defined by the interface in relation with the type of the microprocessor of the system which is connected to the pins of the connector. The memory of the control means then stores a copy of the software of these different microprocessor systems.

BRIEF DESCRIPTION OF THE DRAWINGS

The objects, advantages and other features of the present invention will become more apparent upon reading of the following non restrictive description of a preferred embodiment thereof, given for the purpose of examplification only with reference to the accompanying drawings in which.

DETAILED DESCRIPTION OF THE PREFERRED EMBODIMENT

Figure 1:
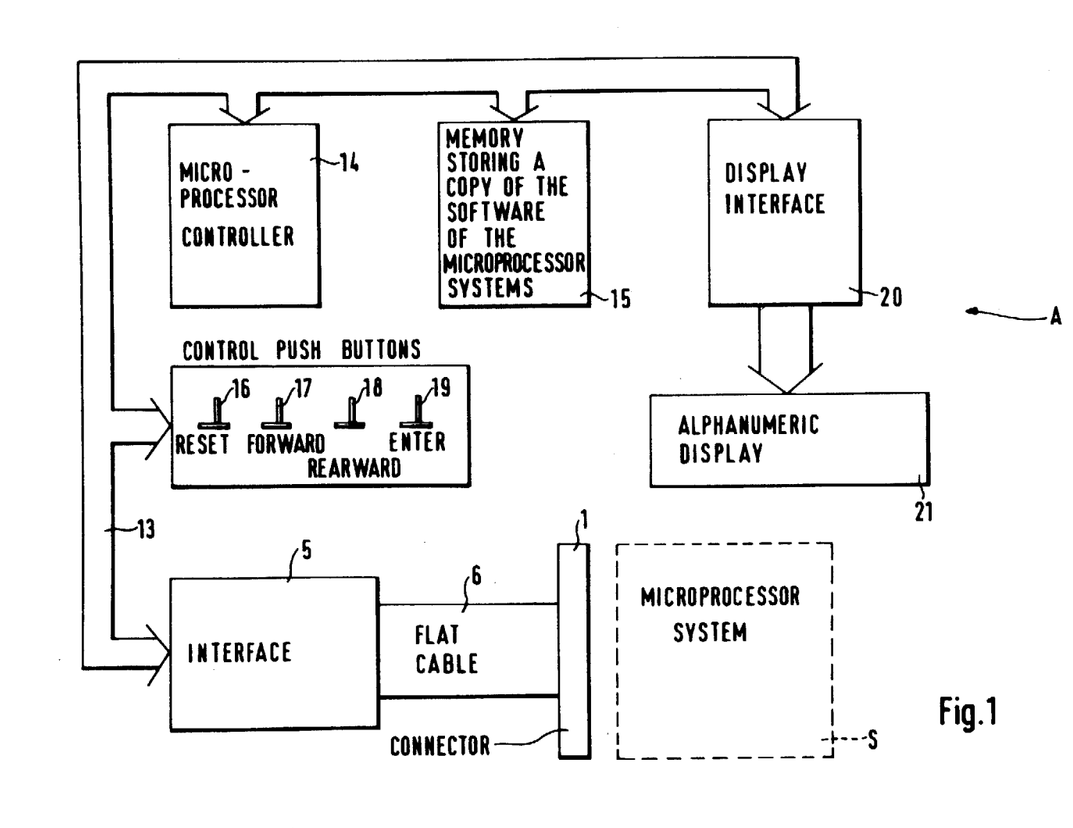
FIG. 1 is a block diagram of an apparatus according to the invention for detecting a fault in a microprocessor system.
Figure 2:
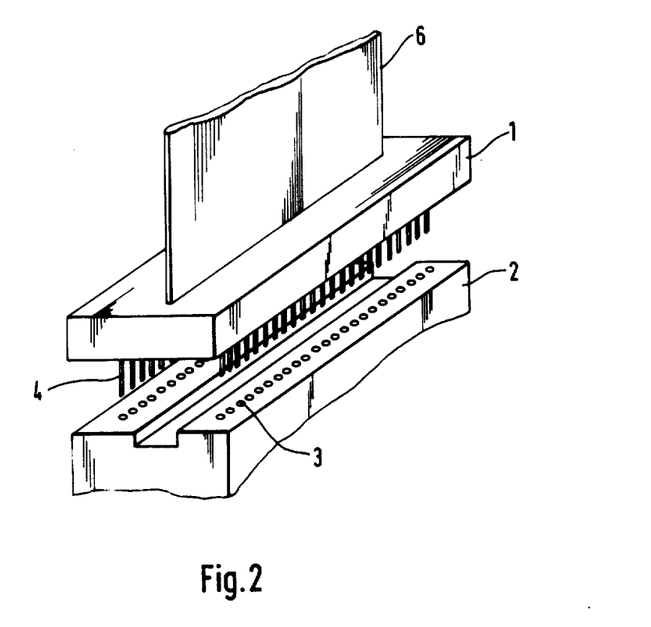
FIG. 2 illustrates a connector forming part of the apparatus of FIG. 1.

As illustrated in FIG. 1, the apparatus A for detecting a fault in a microprocessor system S comprises a connector 1. The details of an example of a such a connector are shown in FIG. 2 of the drawings.

As it is well known, microprocessors are commercialized under the form of integrated circuits comprising a certain number of pins (for example 40 pins). Usually, the pins of a microprocessor are individually connected to the surrounding circuit by means of a connection device such as 2, represented in FIG. 2, which device 2 comprises for receiving each pin of the microprocessor a corresponding socket such as 3, connected to the surrounding circuit.

The connector 1 comprises a same number of pins 4 as the microprocessor of the system S. As the pins of the connector 1 are positionned in the same manner as those of the microprocessor, these pins 4 can be inserted in the sockets 3 of the connection device 2. In order to allow utilization of the apparatus A, the microprocessor is withdrawn from its connection device 2, and the pins 4 of the connector 1 are inserted in the sockets 3 of the device 2.

The apparatus of FIG. 1 further comprises an interface 5 to which are individually connected the pins 4 of the connector 1 by means of a flat cable 6 comprising a number of conductors equal to the number of pins 4. This interface 5 defines, for each pin 4, a bidirectional line connected to this pin through one of the conductors of the cable 6 and having a programmable direction.

Figure 3:
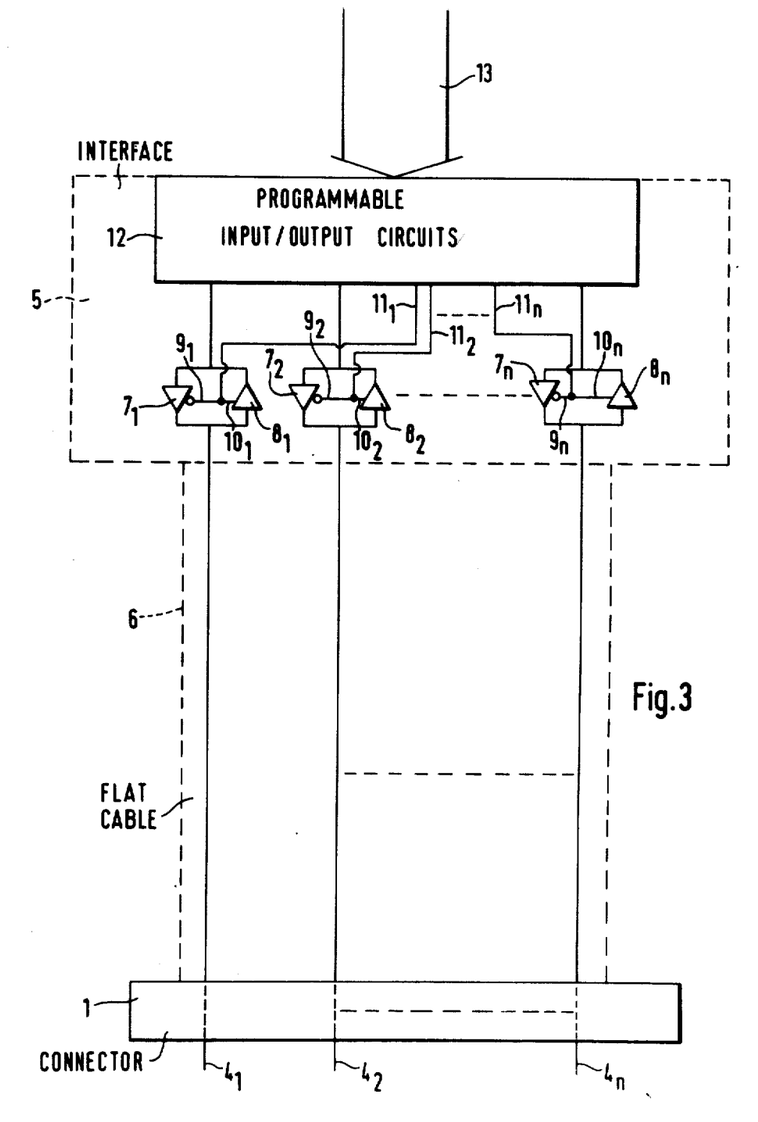
FIG. 3 schematically represents the circuit of an interface of the apparatus of FIG. 1.

For that purpose, the interface 5 comprises, as illustrated in FIG. 3, a pair of buffers 7 and 8 for each pin 4 of the connector 1. The buffers 7 and 8 of each pair are connected in parallel. The buffer 7 of each pair comprises an inverting control input 9 and is oriented so as to conduct in a first direction, while the buffer 8 of each pair comprises a non-inverting control input 10 and is oriented so as to conduct in a direction opposite to the first one. The buffer 7 is thus in a non-conducting state while the buffer 8 is in a conducting state when a high logic level signal is applied on the control inputs 9 and 10. On the contrary, the buffer 7 is in a conducting state while the buffer 8 is in a non-conducting state when a low logic level signal is applied on the control inputs 9 and 10. It is therefore possible to program the direction of the line corresponding to each pair of buffers by means of a single signal having a "high" or "low" logic level and applied to a conductor 11 connected to both the control inputs 9 and 10 of this pair of buffers. The number of conductors 11 required for programming the direction of the lines defined by the interface 5 is then reduced by half. For the purpose of simplification of the drawings, only three of the lines defined by the interface 5 are illustrated in FIG. 3.

The indicia 1, 2 . . . n of FIG. 3 associated to the reference 4 and 7 to 11 identify the pairs of buffers 7 and 8, the control inputs 9 and 10 of these buffers 7 and 8, and the conductors 11 which are respectively associated with the different pins 4 of the connector 1. n represents the total number of pins 4.

The interface 5 further comprises programmable input/output circuits 12 which provide for interface between, on the one hand, the bidirectional lines associated with the pins 4 and the conductors 11, and, on the other hand, a bus 13 connected to a controller 14 (FIG. 1) advantageously designed on the basis of a microprocessor. By means of the circuits 12, the controller 14 can receive through the bus 13 signals from all the lines connected to the pins 4, or transmit also through the bus 13 desired signals on all these lines and also on the conductors 11.

The interface 5 therefore simulates the interconnections which are normally established between the system S and its microprocessor, the latter having been withdrawn. This is of course carried out by the controller 14 which acts on the control inputs 9 and 10 of the pairs of buffers 7 and 8 through the bus 13, the input/output circuits 12 and the conductors 11.

The function of the interface 5 is to allow the apparatus A to communicate with the system S in the same manner as it is done by the microprocessor of this system, and that through the flat cable 6 and the connector 1 inserted in the connection device 2 (FIG. 2), in the place of the microprocessor of the system S. The apparatus A has therefore access to the control, address and data buses of the system S. All the internal circuits of this system S directly or indirectly connected to these buses can therefore be tested by the apparatus A in order to detect a fault.

The microprocessor of the controller 14 of FIG. 1 is programmed to carry out different tests on the microprocessor system S through the bus 13, the interface 5, the flat cable 6 and the connector 1. These tests will be defined in more details hereinafter.

As the direction of the different lines defined by the interface 5 is programmable by means of the pairs of buffers 7 and 8, the interface 5 can be operated to simulate the interconnections with the surrounding circuit of all the types of microprocessors having a number of pins which is the same as that of the connector 1. For example, if the connector 1 has 40 pins, the interconnections with the surrounding circuit of all the types of microprocessors having 40 pins can be simulated by means of the interface 5.

The microprocessor of the controller 14 may thus be programmed to operate the interface 5 in function of the type of the microprocessor of the system S, so that it can simulate the interconnections with the surrounding circuit of a plurality of types of microprocessors associated to different systems. In such a case, the microprocessor of the controller 14 is also programmed to carry out tests on these different systems for the purpose of detecting their faults.

The apparatus A of FIG. 1 further comprises a memory 15 connected to the bus 13 and storing a copy of the software of the different microprocessor systems which can be tested by the apparatus A. This allows the controller 14 to compare the software stored within the system S with the copy stored in the memory 15, so as to check the correctness of the software stored within the system S, as it will be discussed in more details in the following description.

As illustrated in FIG. 1 of the drawings, the detecting apparatus A also comprises control push buttons 16 to 19 and a display interface 20 connected to the bus 13, as well as an alphanumeric display 21 associated with the interface 20. The latter interface 20 is advantageously designed on the basis of a microprocessor which has the function of sweeping and consequently refreshing the display 21. The microprocessor of the controller 14 can thus execute the different programs without having to perform this function. The latter microprocessor has therefore to present the data to the interface 20 only one time, the microprocessor of this interface carrying out display of the corresponding text. A "HAND SHAKING" is however required to ensure synchronization between the display microprocessor and the microprocessor of the controller 14.

The control push buttons 17 to 19, the interface 20 and the display 21 are used to select the type of the faulty system S, and also to select the different tests to be carried out on such a system S.

Following energizing of the apparatus of FIG. 1, the microprocessor of the controller 14 executes a monitor program and communicates with the interface 20 to bring about display of the word "CATALOGUE" on the display 21.

Thereafter, when the "FORWARD" push button 17 is depressed, the name of the first system of a list of different microprocessor systems which can be tested by the apparatus A is displayed on the display 21 by the controller 14 through the interface 20. This list is of course stored is the controller 14. On the contrary, when the "REARWARD" push button 18 is depressed following energizing of the apparatus and display of the word "CATALOGUE", it is the name of the last system of the stored list which is displayed. Of course, each time the "FORWARD" 17 or "REARWARD" 18 push button is subsequently depressed, the name of the following or preceding system of the list, respectively, is displayed. When the type of the desired system is displayed, the "ENTER" push button 19 is depressed and the controller 14 brings about display on the display 21 of the following: "CATALOGUE (NAME OF THE SELECTED SYSTEM)".

It is then possible to select a test amongst a list of tests stored in the controller 14 by means of the "FORWARD" 17 and "REARWARD" 18 push buttons. This is accomplished in the same manner as for the selection of the type of microprocessor system. Of course, the tests of the list allow detection of the fault in the system S of the selected type. When the name of the desired test is displayed, the "ENTER" push button 19 is depressed. The controlled 14 then carries out by means of a program stored therein the corresponding test on the system S, of the selected type, connected to the connector 1. For that purpose, the controller 14 appropriately programs through control of the interface 5 the direction of the lines associated with the pins 4 of the connector 1 in function of the type of the microprocessor of the system S, of the selected type.

The push button 16, when depressed, causes resetting of the program and of the operation of the apparatus of FIG. 1.

Two types of tests can be carried out by the apparatus A, namely dynamic tests and static tests. When appearing on the display 21, the dynamic tests are identified by "DYN", while the static tests are identified by "STA".

A dynamic test is carried out by the detecting apparatus with no intervention of the user. The result of such a test, when completed, appears on the display 21.

Figure 4:
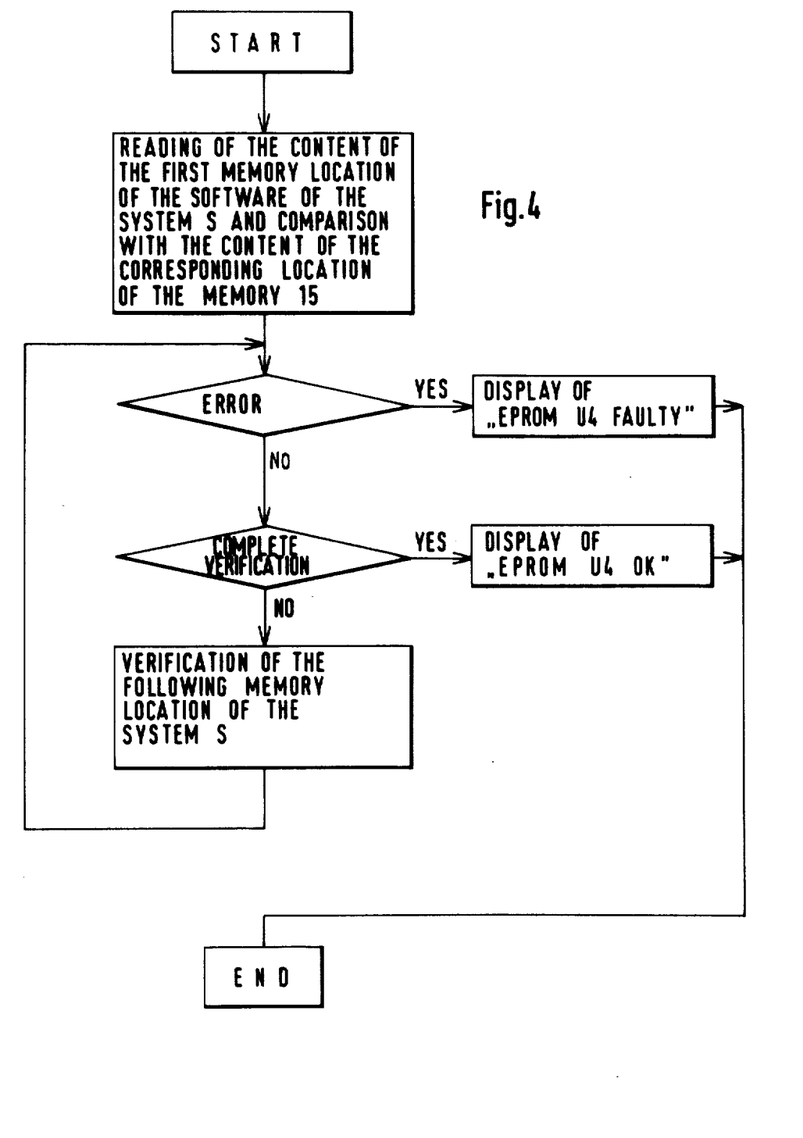
FIG. 4 schematically illustrates the different steps of a dynamic test carried out on the microprocessor system by the apparatus of FIG. 1.

A first example for a dynamic test is the comparison of the software stored within the system S with the copy stored in the memory 15, in order to detect any error in the software stored within the system S connected to the connector 1. For that purpose, the microprocessor of the controller 14 is programmed to generate and to transmit towards the system S through the interface 5 and the connector 1 all the required signals (control and address signals) permitting to the system S to return the content of its memory locations containing the software towards the controller 14 via its own data lines, the connector 1, the flat cable 6, the interface 5 and the bus 13. First, the controller 14 read the content of the first memory location of the software in the system S and compares it to the content of the corresponding location in the memory 15. If the two contents are the same, the controller then reads the content of the second memory location in the system S, and compares it to that of the corresponding location in the memory 15. As soon as the content of a memory location in the system S does not correspond to that of the corresponding location in the memory 15, the controller 14 brings about display by the display 21 of, for example, "EPROM U4 FAULTY" where U4 is the number of the EPROM (Erasable-programmable-read-only-memory) of the system S storing its software. On the contrary, if after verification of all the memory locations storing the software of the system S, no error has been detected, the controller 14 brings about display of, for example, "EPROM U4 OK". The different steps of this dynamic test are represented on the diagram of FIG. 4.

A "WAIT CYCLE" circuit is associated with the microprocessor of the controller 14 in order to adapt the same to the longer access time of some types of ROM (read-only-memory) containing the software of certain microprocessor systems which can be tested by the apparatus.

Another example of dynamic test carried out on the system S by the controller 14 is the verification of each line amongst the lines constituting the address, data and control buses, and of all the other lines in order to determine whether there are two lines which are short-circuited or whether a zero volt signal is continuously present on one of these lines. The result of this test appears on the display ("OK" or "FAULTY"). For that purpose, the controller 14 transmits to the system S appropriate signals (control and address signals) and reads the signals returned from this system S.

Contrary to the dynamic tests, a static test requires intervention from the user with a measuring instrument (generally an oscilloscope or a logical probe) in order to determine the result of the test.

Figure 5:
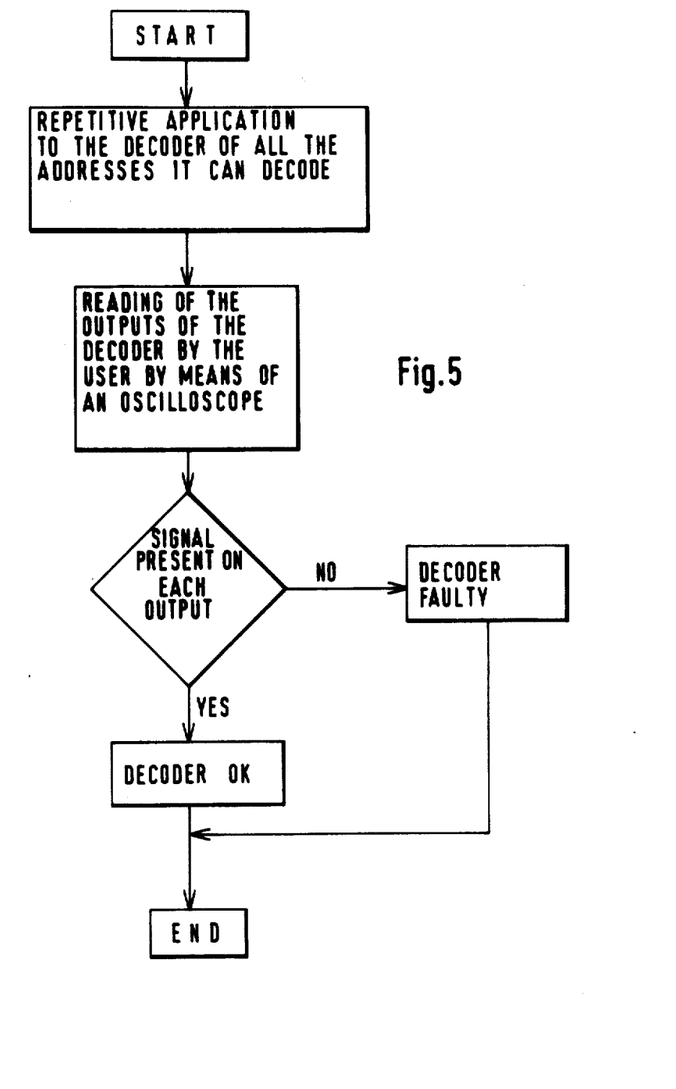
FIG. 5 schematically illustrates the different steps of a static test carried out on the microprocessor system.

An example for a static test is a test designed to determine whether an address decoder is appropriately operating. In order to carry out such a test, the microprocessor of the controller 14 is programmed to apply successively and repetitively to the address decoder of the system S all the addresses which can be decoded by the same. The user must then, by means of the measuring instrument, read each output of the decoder to determine whether a signal is present on each of the output pins of the decoder. If yes, the decoder is operating properly, while in the contrary it is faulty. The different steps of this static test are represented by the diagram of FIG. 5. The intervention required for each of the static tests can be explained in the documentation accompanying the apparatus A.

Although only some tests have been specifically discussed hereinabove, it will be apparent to those skilled in the art related to the present invention that the controller 14 may be programmed to carry out on the system S a great number of different tests, dynamic or static. The number and the nature of these tests depend of course on the specific structure and on the particularities of the faulty microprocessor system S. These tests must also be enough numerous to allow detection of any fault which can occur in the system S.

If all the available tests have been carried out on the faulty system S without allowing detection of the fault, this indicates that it is the microprocessor, withdrawn from the system, which is faulty.

As can be appreciated from the above description, the controller 14 may be programmed to test a great number of systems provided with microprocessors having a number of pins which is the same as that of the connector 1. A copy of the software of these systems can also be stored in the memory 15. In such a case, the limitative factor is the storing capacity of the apparatus.

The use of the apparatus A is very simple due to the development of a specific software for each microprocessor system to be tested. The software permits to a user having a minimum knowledge concerning microprocessors to carry out complicated tests on complex systems built around microprocessors.

Moreover, the apparatus A may be adapted through modification of its software to any new system to be tested and having a microprocessor provided with a number of pins equal to that of the connector 1, and that without modifying either its operation mode or its circuit. This makes it extremely flexible and evolutionary. That is possible due to the provision of the interface 5 of FIG. 1.

Last at all, it is convenient to mention that the controller 14 may further be programmed to carry out an autoverification of the apparatus A. To realize this function, the apparatus A is provided with an autoverification connection device (not illustrated) similar to the device 2 of FIG. 2, and whose sockets are interconnected by pairs (two by two).

After the pins 4 of the connector 1 have been inserted in the sockets of the autoverification connection device, the controller 14 transmits, through the input/output circuits 12, signals on the lines defined by the interface 5 and corresponding to a first socket of each pair of interconnected sockets of the autoverification connection device. The signals are then returned by the lines defined by the interface 5 and corresponding to the second socket of each pair of interconnected sockets of the autoverification connection device, and received by the controller 14 through the circuits 12. Of course, the controller 14 programs beforehand and as required the direction of the lines defined by the interface 5. The signals can also be transmitted through the lines associated with the second sockets and returned through the lines associated with the first sockets, so that proper operation of these lines in the two directions can be determined.

The autoverification consequently permits to the controller 14 to test the interface 5, the flat cable 6, and the connector 1. As the autoverification is selected by means of the control push buttons, of the controller 14, of the display interface 20, and of the display 21, as described hereinabove since the autoverification constitutes an item in the above mentionned stored list of the different microprocessor systems which can be tested by the apparatus A, and as the autoverification is carried out by means of the controller 14, it therefore allows in addition a certain autoverification of the proper operation of the control push buttons, of the controller 14, of the display interface 20 and of the display 21, as well as of the bus 13. After the autoverification item appears on the display 21, the controller 14 carries out such an autoverification in response to depression of the "ENTER" push button 19. The result of the autoverification is of course displayed on the alphanumeric display 21.

Although the present invention has been described in details hereinabove by means of a preferred embodiment thereof, such an embodiment may be modified at will, within the scope of the appended claims, without changing or altering the nature of the present invention.

What is claimed is:

1. An apparatus for detecting a fault in a system including a microprocessor, said microprocessor comprising a plurality of pins individually connected to the system through a connection device, said detecting apparatus comprising:

a connector provided with pins so positioned that they can be individually connected to the system through said connection device, in the place of the pins of the microprocessor after the latter has been withdrawn from the system;

an interface defining for each pin of said connector a line connected to this pin and having a programmable direction; and control means connected to the interface for (a) programming the direction of the lines defined by said interface in order to simulate by means of these lines interconnections which are normally established between the system and its microprocessor, and (b) carrying out tests on the microprocessor system through the interconnections simulated by the interface for detecting the fault in said system.

2. An apparatus according to claim 1, in which said connector and the microprocessor comprise a same number of pins, the pins of said connector being positioned in the same manner as those of the microprocessor so that they can be individually connected to the system through said connection device.

3. The apparatus of claim 1, wherein the interface comprises a pair of buffers for each line defined by said interface, the buffers of each pair being connected in parallel and being oriented so as to conduct in opposite directions.

4. An apparatus according to claim 3, wherein each buffer comprises a control input through which a conducting or non-conducting state is given to the buffer, the direction of each line defined by the interface being programmed by the control means through said inputs of the buffers of the corresponding pair of buffers.

5. The apparatus of claim 4, in which the control input of a first buffer of each pair is an inverting control input while the control input of the second buffer of the same pair is a non-inverting control input, said inverting and non-inverting inputs of the buffers of a same pair being interconnected together to form a single control input of this pair of buffers so that the direction of the corresponding line defined by the interface can be programmed by applying a signal on said single control input of the pair of buffers.

6. An apparatus according to claim 5, in which the interface comprises programmable input/output circuits interposed between, on the one hand, the lines defined by the interface and the single control inputs of the pairs of buffers, and, on the other hand, the control means.

7. The apparatus of claim 1, wherein the control means comprises means for storing a copy of the software of the microprocessor system.

8. An apparatus according to claim 7, wherein the control means further comprises means for reading through the interface and said connector the software stored within the microprocessor system, and means for comparing the so read software with said copy in order to detect any error in the software stores within the system, reading of the software stored within the microprocessor system and comparison of the so read software with said copy constituting one of said tests carried out on the system.

9. The apparatus of claim 1, in which the control means comprises a controller programmed to carry out, through the interface and said connector, tests on a plurality of systems including microprocessors of different types, and to program the direction of the lines defined by the interface in relation with the type of the microprocessor of the system connected to said connector through said connection device.

10. An apparatus according to claim 1, in which the control means comprises a controller programmed to carry out, through said interconnections simulated by the interface, tests on a plurality of microprocessor systems of different types when connected to said apparatus through said connector.

11. The apparatus of claim 10, wherein the control means further comprises a memory for storing a copy of the software of said microprocessor systems.

12. An apparatus according to claim 10, wherein the control means comprises means for selecting the type of the microprocessor system connected to said connector in order to allow said controller to use a program portion associated with this type of microprocessor system.

13. The apparatus of claim 12, in which said selecting means comprises control push buttons and display means.

14. An apparatus according to claim 12, in which the control means further comprises means for selecting the tests to be carried out on the microprocessor system connected to said connector.

15. The apparatus of claim 14, wherein said test selecting means comprises control push buttons and display means.

16. An apparatus according to claim 1, wherein the control means comprises means for selecting the tests to be carried out on the microprocessor system.

17. The apparatus of claim 16, in which the selecting means comprises control push buttons and display means.

18. An apparatus according to claim 1, wherein the control means comprises display means for displaying the result of the tests carried out on the microprocessor system.

19. An apparatus according to claim 1, wherein said tests comprise dynamic tests, said control means comprising a controller programmed to carry out the dynamic tests which require no intervention from a user of said apparatus.

20. The apparatus of claim 1, in which said tests comprise static tests, said control means comprising a controller programmed to carry out said static tests which each allow a user of said apparatus to determine whether a part of the circuit of the system is faulty by means of at least one measurement carried out by the user on the microprocessor system with a measuring instrument.

* * * * *